United States Patent
Gupta et al.

(10) Patent No.: US 9,057,826 B2
(45) Date of Patent: Jun. 16, 2015

(54) SEE-THROUGH NEAR-TO-EYE DISPLAY WITH EYE PRESCRIPTION

(71) Applicant: Google Inc., Mountain View, CA (US)

(72) Inventors: Anurag Gupta, Los Gatos, CA (US); Greg E. Priest-Dorman, Berkeley, CA (US); Bernard C. Kress, Redwood City, CA (US)

(73) Assignee: Google Inc., Mountain View, CA (US)

( * ) Notice: Subject to any disclaimer, the term of this patent is extended or adjusted under 35 U.S.C. 154(b) by 178 days.

(21) Appl. No.: 13/756,249

(22) Filed: Jan. 31, 2013

(65) Prior Publication Data

US 2014/0211146 A1    Jul. 31, 2014

(51) Int. Cl.
| | |
|---|---|
| G02C 1/00 | (2006.01) |
| G02B 3/12 | (2006.01) |
| G02C 11/00 | (2006.01) |
| G02B 5/18 | (2006.01) |
| G02B 27/01 | (2006.01) |

(52) U.S. Cl.
CPC ...... *G02B 3/12* (2013.01); *G02C 11/10* (2013.01); *G02B 5/18* (2013.01); *G02B 27/0101* (2013.01); *G02B 2027/013* (2013.01); *G02B 2027/011* (2013.01)

(58) Field of Classification Search
CPC ........ G02C 7/024; G02C 7/027; G02C 11/10; G02B 27/144; G02B 27/145; G02B 27/146; G02B 27/0172; G02B 2027/0178
USPC ...................... 351/158, 159.68; 359/630, 631
See application file for complete search history.

(56) References Cited

U.S. PATENT DOCUMENTS

| | | | |
|---|---|---|---|
| 3,936,605 A * | 2/1976 | Upton | ............................ 704/271 |
| 4,799,765 A | 1/1989 | Ferrer | |
| 5,050,966 A | 9/1991 | Berman | |

(Continued)

FOREIGN PATENT DOCUMENTS

| | | |
|---|---|---|
| EP | 0 898 726 B1 | 3/2000 |
| EP | 0 995 145 B1 | 9/2001 |

(Continued)

OTHER PUBLICATIONS

PCT/US2014/010192; PCT International Search Report and Written Opinion of the International Searching Authority, mailed Jun. 11, 2014, 11 pages.

(Continued)

*Primary Examiner* — Huy K Mai (74) *Attorney, Agent, or Firm* — Blakely Sokoloff Taylor & Zafman LLP (57) ABSTRACT

An optical apparatus includes an optical combiner, an image lens, and an external scene lens. The optical combiner has an eye-ward side and an external scene side and includes a partially reflective diffraction grating that is at least partially reflective to image light incident through the eye-ward side and at least partially transmissive to external scene light incident through the external scene side. A first mount is positioned to hold the image lens in an optical path of the image light to apply a first corrective prescription to the image light. A second mount is positioned to hold an external scene lens over the external scene side of the optical combiner to apply a second corrective prescription to the external scene light. The optical combiner combines the image light with the scene light to form a combined image that is corrected according to the first and second corrective prescriptions.

19 Claims, 8 Drawing Sheets

(56) References Cited

U.S. PATENT DOCUMENTS

| | | |
|---|---|---|
| 5,191,472 A | 3/1993 | Kurematsu et al. |
| 5,237,455 A | 8/1993 | Bordo et al. |
| 5,537,253 A | 7/1996 | Cox et al. |
| 5,694,230 A | 12/1997 | Welch |
| 5,821,911 A | 10/1998 | Jachimowicz |
| 5,870,224 A | 2/1999 | Saitoh et al. |
| 5,880,888 A | 3/1999 | Schoenmakers et al. |
| 5,886,822 A | 3/1999 | Spitzer |
| 5,943,171 A | 8/1999 | Budd et al. |
| 5,949,583 A | 9/1999 | Rallison et al. |
| 5,995,071 A | 11/1999 | Mertz |
| 6,005,714 A | 12/1999 | Welch |
| 6,097,543 A | 8/2000 | Rallison et al. |
| 6,147,807 A | 11/2000 | Droessler et al. |
| 6,204,975 B1 | 3/2001 | Watters et al. |
| 6,236,509 B1 | 5/2001 | Grandjean et al. |
| 6,236,511 B1 | 5/2001 | Brown |
| 6,256,149 B1 | 7/2001 | Rolfe |
| 6,330,118 B1 | 12/2001 | Daschner et al. |
| 6,349,004 B1 | 2/2002 | Fischer et al. |
| 6,353,503 B1 | 3/2002 | Spitzer et al. |
| 6,462,882 B2 | 10/2002 | Chen et al. |
| 6,466,471 B1 | 10/2002 | Bhattacharyya |
| 6,690,516 B2 | 2/2004 | Aritake et al. |
| 6,829,095 B2 | 12/2004 | Amitai |
| 6,847,488 B2 | 1/2005 | Travis |
| 7,095,562 B1 | 8/2006 | Peng et al. |
| 7,119,965 B1 | 10/2006 | Rolland et al. |
| 7,145,726 B2 | 12/2006 | Geist |
| 7,205,960 B2 | 4/2007 | David |
| 7,230,766 B2 | 6/2007 | Rogers |
| 7,450,310 B2 | 11/2008 | McGuire |
| 7,542,209 B2 | 6/2009 | McGuire, Jr. |
| 7,566,863 B2 | 7/2009 | Chang et al. |
| 7,595,480 B2 | 9/2009 | Kress |
| 7,595,933 B2 | 9/2009 | Tang |
| 7,637,617 B2 | 12/2009 | Liu et al. |
| 7,656,585 B1 * | 2/2010 | Powell et al. ................. 359/630 |
| 7,715,103 B2 | 5/2010 | Sprague et al. |
| 7,724,442 B2 | 5/2010 | Amitai |
| 7,821,715 B2 | 10/2010 | Suzuki et al. |
| 7,895,780 B2 | 3/2011 | Lee |
| 8,384,999 B1 | 2/2013 | Crosby et al. |
| 2003/0058543 A1 | 3/2003 | Sheedy et al. |
| 2007/0070859 A1 | 3/2007 | Hirayama |
| 2010/0079356 A1 | 4/2010 | Hoellwarth |
| 2010/0149073 A1 | 6/2010 | Chaum et al. |
| 2011/0213664 A1 | 9/2011 | Osterhout et al. |
| 2011/0221656 A1 | 9/2011 | Haddick et al. |
| 2011/0261451 A1 | 10/2011 | Kwrk |
| 2011/0261466 A1 | 10/2011 | Buch et al. |
| 2012/0212399 A1 | 8/2012 | Border et al. |
| 2012/0293548 A1 | 11/2012 | Perez et al. |
| 2013/0229712 A1 * | 9/2013 | Kress ............................ 359/572 |

FOREIGN PATENT DOCUMENTS

| | | |
|---|---|---|
| JP | 2002-090687 | 3/2002 |
| KR | 10-2007-0105657 | 10/2007 |
| KR | 10-2011-0117581 | 10/2011 |
| WO | WO 2007/065995 A1 | 6/2007 |
| WO | WO 2009/153446 A2 | 12/2009 |
| WO | WO 2012/003529 A1 | 1/2012 |
| WO | WO 2012/056817 A1 | 5/2012 |

OTHER PUBLICATIONS

Kress, Bernard et al., "Low Cost Replicable Plastic HUD combiner element", Photonics in the Transportation Industry: Auto to Aerospace II, Proc. SPIE vol. 7314, 73140l, Apr. 13, 2009, 8 pages, Orlando, Florida.

Kress, Bernard et al., "Digital combiner achieves low cost and high reliability for head-up display applications", SPIE Newsroom. DOI: 10.1117/2.1200904.1599, May 18, 2009, 3 pages.

Kress, Bernard et al., "Applied Digital Optics: From Micro-optics to Nanophotonics, Chapter 5: Digital Diffractive Optics: Analytic Type", 40 pages, 2009, John Wiley & Sons, Ltd.

Kress, Bernard et al., "Applied Digital Optics: From Micro-optics to Nanophotonics, Chapter 12: Digital Optics Fabrication Techniques", 74 pages, 2009, John Wiley & Sons, Ltd.

Kress, Bernard et al., "Applied Digital Optics: From Micro-optics to Nanophotonics, Chapter 14: Replication Techniques for Digital Optics", 27 pages, 2009, John Wiley & Sons, Ltd.

Kress, Bernard et al., "Applied Digital Optics: From Micro-optics to Nanophotonics, Chapter 16: Digital Optics Application Pools", 60 pages, 2009, John Wiley & Sons, Ltd.

Kress, Bernard, "Sandwiched Diffractive Optical Combiner," U.S. Appl. No. 13/411,346, filed Mar. 2, 2012, 30 pages.

Saeedi, Ehsan et al., "Adjustable Lens Array With Variable Optical Power," U.S. Appl. No. 13/742,201, filed Jan. 15, 2013, 28 pages.

Adlens, "Emergensee," Adlens Variable Focus Eyewear, www.adlens.com, 3 page brochure downloaded from Internet, Nov. 2012.

Adlens, "Hemisphere Instant Prescription Eyeware," Adlens Variable Focus Eyewear, www.adlens.com, 4 page brochure downloaded from Internet, Nov. 2012.

Adlens, "John Lennon Collection," Adlens Variable Focus Eyewear, www.adlens.com, 4 page brochure downloaded from Internet, Nov. 2012.

* cited by examiner

SEE-THROUGH NEAR-TO-EYE DISPLAY WITH EYE PRESCRIPTION

TECHNICAL FIELD

This disclosure relates generally to the field of optics, and in particular but not exclusively, relates to near-to-eye displays.

BACKGROUND INFORMATION

In the field of optics, a combiner is an optical apparatus that combines two images together, from either the same side of the combiner (reflective/reflective, or transmissive/transmissive) or from the two different sides of the combiner (reflective/transmissive). Often times, optical combiners are used in heads up displays ("HUDs"), sometimes referred to as head mounted displays ("HMDs") or near-to-eye displays, which allow a user to view a computer generated image ("CGI") superimposed over an external view. The HUD enables the user to view the CGI without having to look away from his usual viewpoint. The term HUD originated from its use in avionics, which enabled a pilot to view information while looking forward with his head up, as opposed to looking down at an instrument panel. Conventional HUDs include tilted dichroic plates, holographic combiners, angled transparent substrates, and compound conjugate lenses.

Two versions of combiners exist. The first version combines two fields without adding any lensing to either field (typically a tilted dichroic plate or compound conjugate lenses). The second version includes a lensing functionality, in addition to the combining functionality, which is usually an off-axis aspheric lensing for the field coming from the display. The lensing functionality is used to displace the virtual image originating from the display into the far field or at a specific distance from the combiner and to give the image a certain field of view to enable the user to bring the virtual image into focus at the target size.

Since near-to-eye displays by definition are worn close to the user's eyes, HUDs can physically interfere with conventional prescription corrective glasses. In some configurations, a HUD may be worn over prescription corrective glasses, but such configurations are often awkward and uncomfortable. Conventional near-to-eye displays are not well suited for use with users that require prescription corrective lenses, unless the user chooses to wear contact lenses. However, many people who need prescription corrective lenses choose not to wear contact lenses for a variety of reasons and are thus left with less than desirable options when wearing HUDs.

SUMMARY OF INVENTION

In one embodiment of the disclosure, an optical apparatus for a head mounted display includes an image source, an optical combiner, an image lens, and an external scene lens. The image source is coupled to emit image light. The optical combiner has an eye-ward side and an external scene side and includes a partially reflective diffraction grating that is at least partially reflective to the image light incident through the eye-ward side of the optical combiner and at least partially transmissive to external scene light incident through the external scene side of the optical combiner. The image lens is disposed in an optical path of the image light between the image source and the eye-ward side of the optical combiner to apply a first corrective prescription to the image light emitted from the image source. The external scene lens is disposed over the external scene side of the optical combiner to apply a second corrective prescription to the external scene light that passes through the optical combiner. The optical combiner combines the image light with the scene light to form a combined image that is corrected according to the first and second corrective prescriptions and propagates along a common viewing path extending along an eye-ward direction from the eye-ward side.

In one embodiment of the disclosure, an optical apparatus includes an optical combiner, a first mount, and a second mount. The optical combiner has an eye-ward side and an external scene side and includes a partially reflective diffraction grating that is at least partially reflective to image light incident through the eye-ward side of the optical combiner and at least partially transmissive to external scene light incident through the external scene side of the optical combiner. The first mount is positioned to hold an image lens in an optical path of the image light to apply a first corrective prescription to the image light prior to reaching the eye-ward side of the optical combiner. The second mount is positioned to hold an external scene lens over the external scene side of the optical combiner to apply a second corrective prescription to the external scene light that passes through the optical combiner. The optical combiner combines the image light with the scene light to form a combined image that is corrected according to the first and second corrective prescriptions and propagates along a common viewing path extending along an eye-ward direction from the eye-ward side.

The above embodiments along with other embodiments and features are described in greater detail below.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus, system, and methods of fabrication of a see-through near-to-eye display that accommodates a corrective eye prescription are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
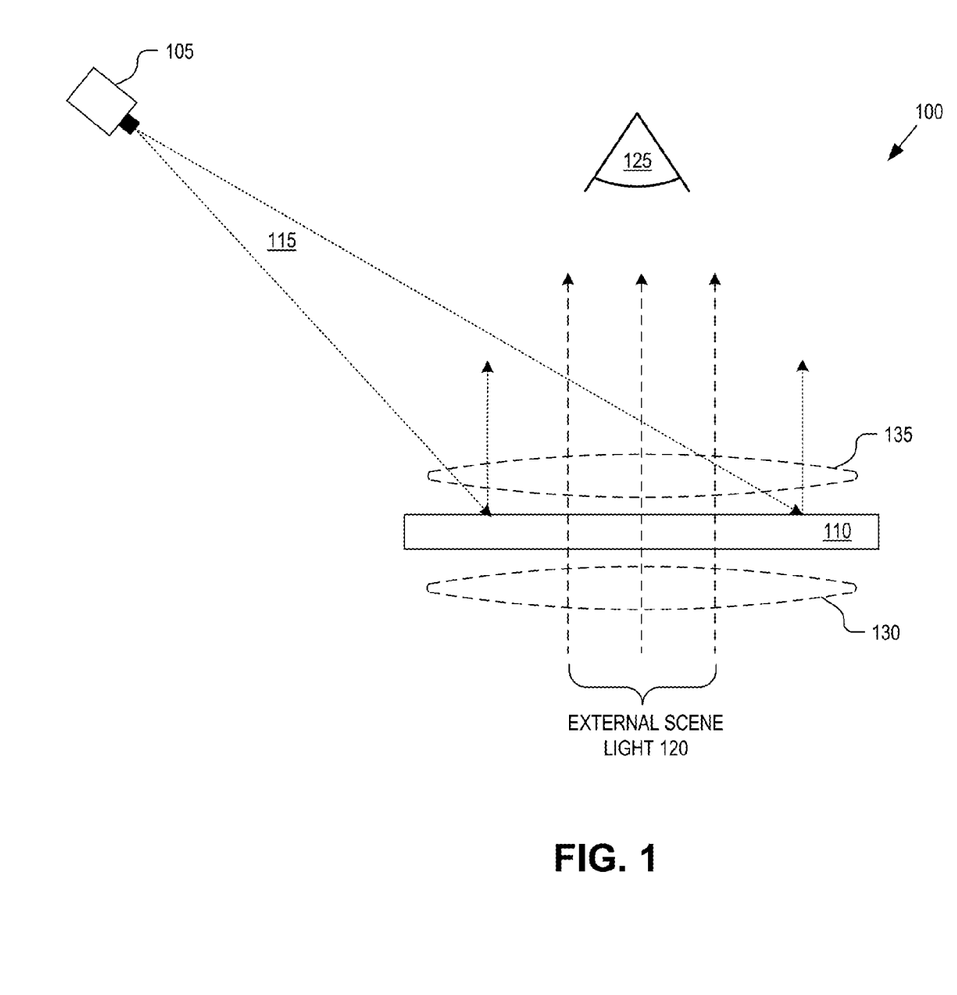
FIG. 1 is a functional block diagram illustrating challenges with incorporating an eye prescription with a see-through near-to-eye display.

FIG. 1 is a functional block diagram illustrating challenges with incorporating an eye prescription into a see-through near-to-eye display 100. Display 100 includes an image source 105 and a see-through optical combiner 110. Optical combiner 110 operates to overlay or otherwise combine the image light 115 output from image source 105 with external scene light 120 that passes through optical combiner 110. The combined image is directed to eye 125 along a combined viewing path extending from the eye-ward side of optical combiner 110 towards eye 125.

Accommodating a corrective eye prescription into display 100 for users that do not wear contact lenses presents some challenges to do so in a cost effective manner that does not unduly add weight or otherwise sacrifice industrial design. For example, if a corrective lens 130 is positioned over just the external scene side of optical combiner 110, then image light 115 does not receive any prescriptive correction. Correspondingly, if a corrective lens 135 is positioned over the eye-ward side of optical combiner 110, then image light 115 traverses this lens twice compared to only a single traversal by external scene light 120, resulting in unequal prescriptive correction being applied to the two images.

Figure 2:
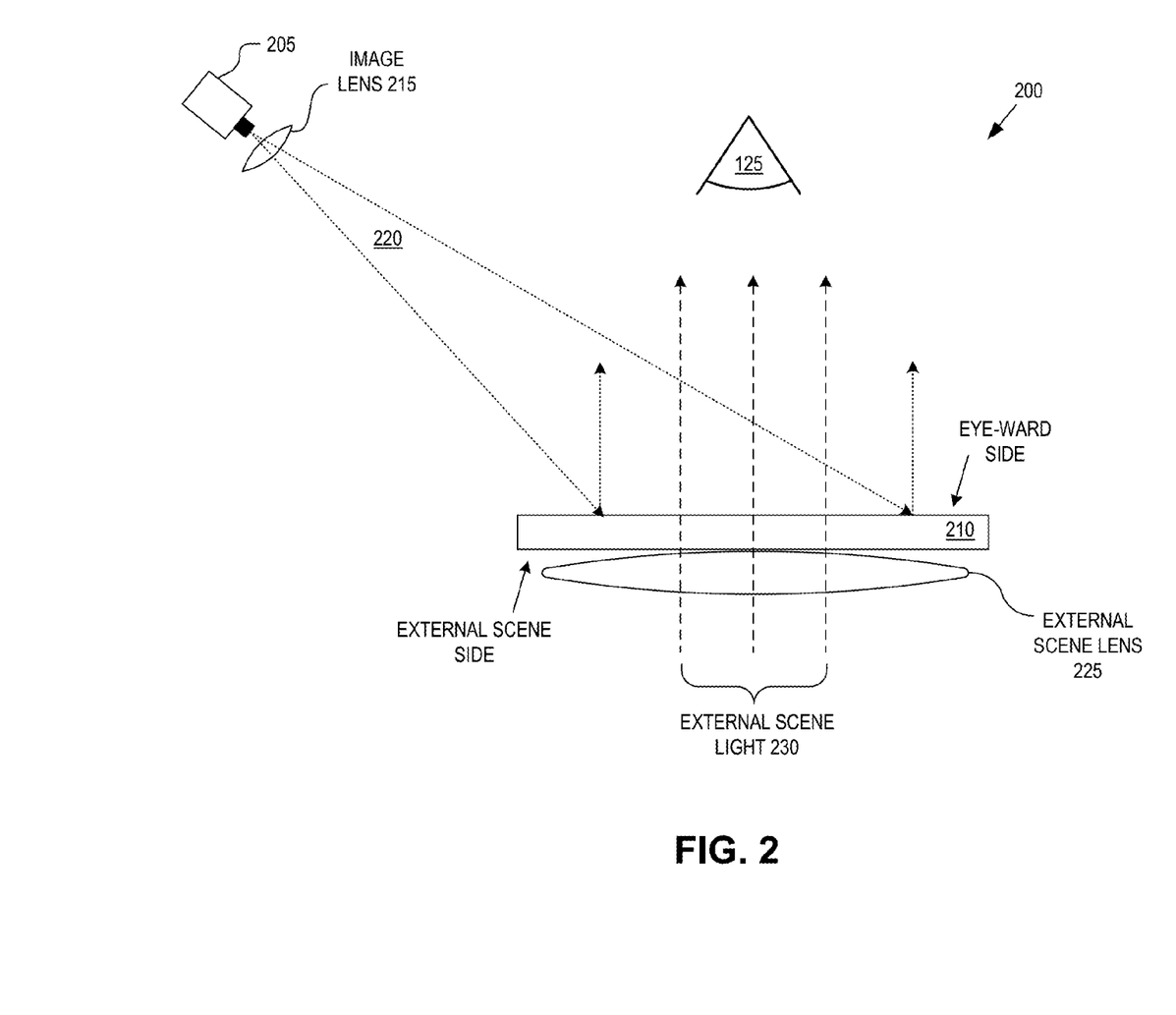
FIG. 2 is a functional block diagram illustrating a see-through near-to-eye display that accommodates an eye prescription, in accordance with an embodiment of the disclosure.

FIG. 2 is a functional block diagram illustrating a see-through display 200 that accommodates an eye prescription, in accordance with an embodiment of the disclosure. See-through display 200 overcomes the challenges described above in connection with display 100 and is capable of applying an effectively consistent prescriptive correction to both the image light and the external scene light while maintaining desirable industrial design. The corrective prescriptions discussed herein may be used to correct nearsightedness, farsightedness, or other visual impairments. See-through display 200 may be implemented in a near-to-eye configuration, such as a head mounted display ("HMD") or heads up display ("HUD"). Other applications are possible as well.

The illustrated embodiment of display 200 includes a image source 205, an optical combiner 210, an image lens 215 that applies a first corrective prescription to image light 220 and an external scene lens 225 that applies a second corrective prescription to external scene light 230.

Display light 220 output from image source 205 is adjusted for a user's corrective prescription using image lens 215. In the illustrated embodiment, image lens 215 is substantially smaller than external scene lens 225, since it need only span the emission aperture of image source 205 as opposed to the field of view of the user. For example, image lens 215 may be approximately the size of a contact lens. Image source 205 and image lens 215 are physically offset (e.g., laterally) behind the eye-ward side of optical combiner 210 to illuminate the eye-ward side of optical combiner 210. This configuration enables image source 205 and image lens 215 to be positioned near a user's temple region (e.g., inside the ear-arm of an eyeglass frame) and lends itself well to a compact and desirable industrial design.

In one embodiment, image lens 215 is inserted into a mount disposed in front of the emission aperture of image source 205 thereby facilitating a replaceable design whereby the user can swap out image lens 215 as their prescription changes or as different users wear display 200. The mount may be a slot into which image lens 215 is inserted or slid, a clip attachment, a hinging clasp or clamp, transparent glue, a friction fit, or otherwise. In an alternative embodiment, image lens 215 is an adjustable lens that can change its corrective prescription according to a user's needs. For example, image lens 215 may be implemented as a fluid lens, an index matched fluid lens, or a pair of complementary back-to-back sliding lens (e.g., similar to the Alvarez lens offered by the UK based Adlens®), or otherwise. Image lens 215 may be implemented as a refractive or diffractive lens.

External scene light 230 transmitted through optical combiner 210 is adjusted for a user's corrective prescription using external scene lens 225. External scene lens 225 overlays the external scene side of optical combiner 210. External scene lens 225 covers at least a substantial portion of the user's field of view to apply its prescriptive correction to the user's external view.

In one embodiment, external scene lens 225 is interchangeably mounted in front of optical combiner 210 to facilitate a replaceable design whereby the user can swap out external scene lens 225 as their prescription changes or as different users wear display 200. The mount may be a slot into which image lens 225 is inserted or slid, a clip attachment, a hinging clasp or clamp, a friction fit, a semi-permanent transparent glue, or otherwise. In one embodiment, external scene lens 225 is index matched to optical combiner 210 to reduce internal reflections and refractive light bending. In embodiments where external scene lens 225 is not index matched to optical combiner 210, anti-reflective coatings may be applied to one or both of the interfacing surfaces of optical combiner 210 and external scene lens 225.

In another embodiment, external scene lens 225 is implemented as an adjustable lens that can change its corrective prescription according to a user's needs. For example, external scene lens 225 may be implemented as a fluid lens, an index matched fluid lens, or a pair of complementary back-to-back sliding lens (e.g., similar to the Alvarez lens offered by the UK based Adlens®), or otherwise. For example, the sliding lens may include two overlapping lens elements that slide laterally relative to each other thereby achieving an adjustable prescription. External scene lens 225 may be implemented as a refractive or diffractive lens.

Image lens 215 and external scene lens 225 may apply the same corrective prescription or different corrective prescriptions according to a user's needs. For example, due to the geometry, relative position, and size differences between image lens 215 and external scene lens 225, these lenses may each impart a slightly different corrective prescription to achieve an effective corrective prescription that is perceived to be consistent for both image light 220 and external scene light 230 from the user's perspective. These changes may be akin to prescription corrections applied to contact lenses versus eyeglasses.

Figure 3:
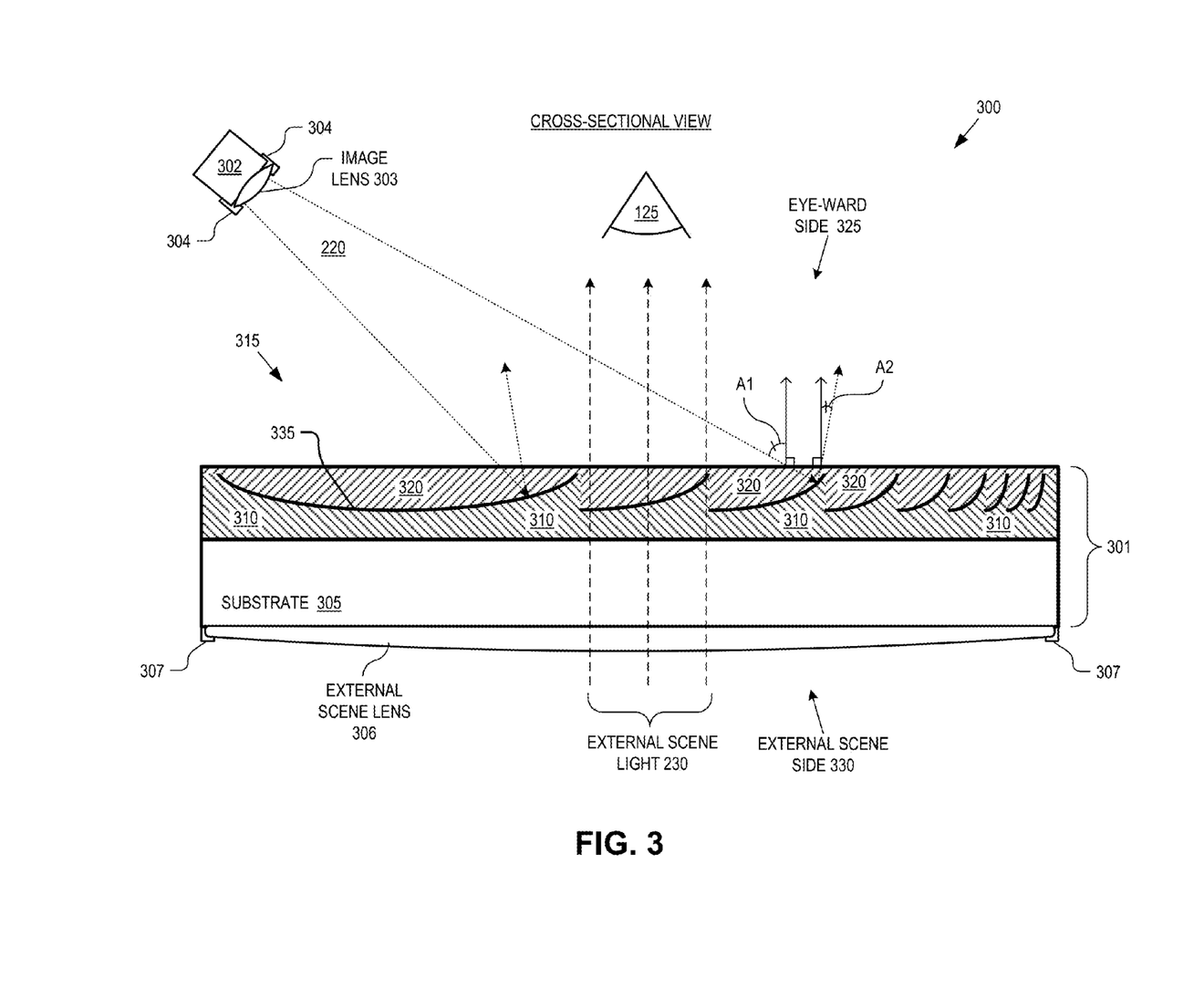
FIG. 3 illustrates a see-through near-to-eye display implemented with a sandwiched diffractive optical combiner that accommodates an eye prescription, in accordance with an embodiment of the disclosure.
Figure 4:
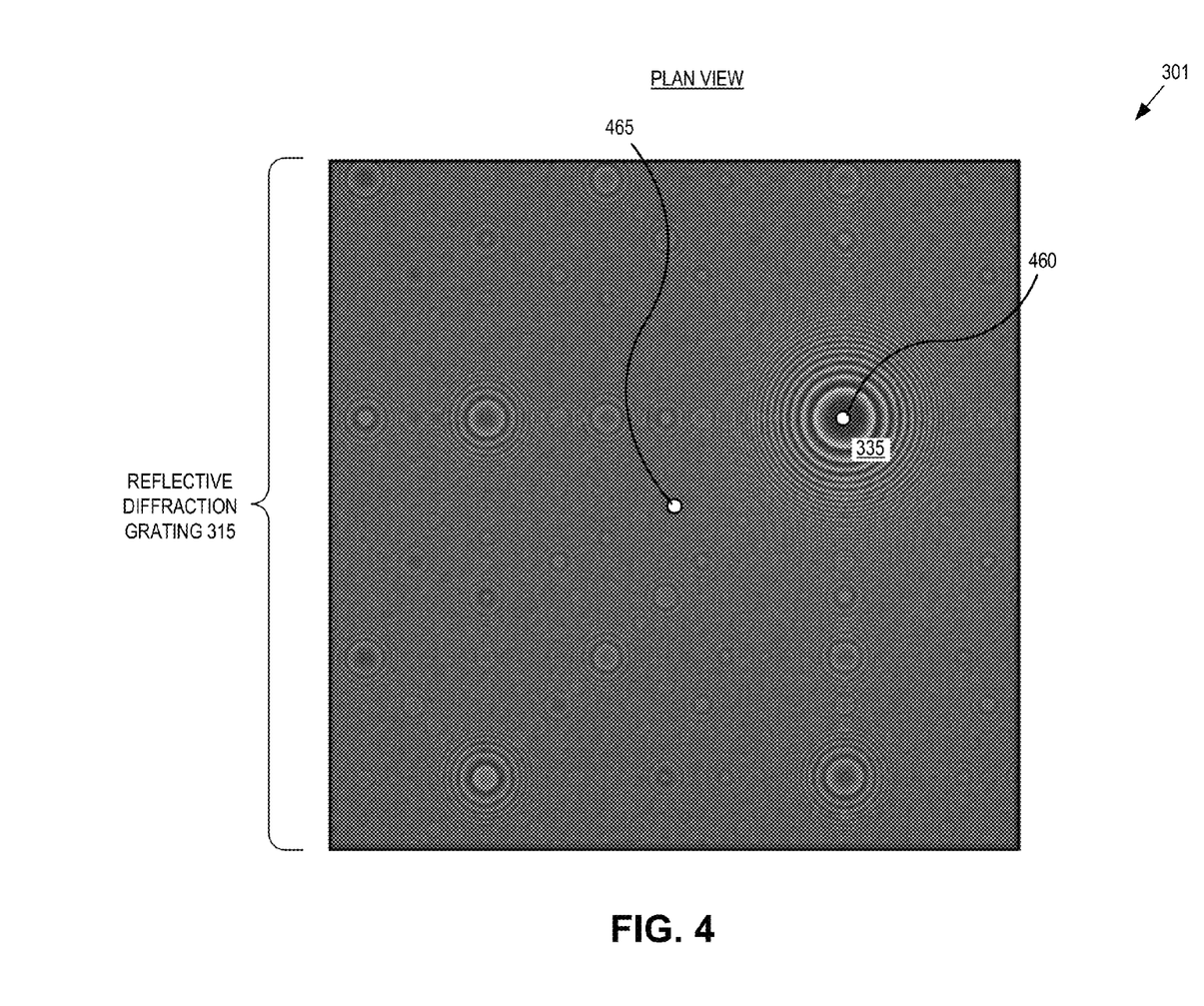
FIG. 4 is a plan view of a sandwiched diffractive optical combiner, in accordance with an embodiment of the disclosure.

FIG. 3 illustrates a see-through display 300 including a sandwiched diffractive optical combiner 301, in accordance with an embodiment of the disclosure. FIG. 3 illustrates a cross-sectional view of optical combiner 301 while FIG. 4 illustrates a plan view of the same. See-through display 300 is one possible implementation of display 200 (illustrated in FIG. 2) and correspondingly, sandwiched diffractive optical combiner 301 is one possible implementation of optical combiner 210.

The illustrated embodiment of see-through display 300 includes a sandwiched diffractive optical combiner 301, image source 302, image lens 303, lens mounts 304, external scene lens 306, and lens mounts 307. The illustrated embodiment of optical combiner 301 includes a substrate 305, a base sandwich layer 310, a reflective diffraction grating 315, a planarization sandwich layer 320, an eye-ward side 325, and an external scene side 330. The illustrated embodiment reflective diffraction grating 315 is formed of a two-dimensional ("2D") array of three-dimensional ("3D") diffraction element shapes formed into base sandwich layer 310 with partially reflective elements 335 coated onto the 3D diffraction element shapes and conforming thereto.

Optical combiner 301 is referred to as a sandwiched optical combiner since it sandwiches reflective diffraction grating 315 between two material layers (i.e., base sandwich layer 310 and planarization sandwich layer 320) having substantially equal, if not identical, indexes of refraction. By doing this, optical combiner 301 simultaneously operates in both reflection and transmission modes with each mode having different characteristics. In reflection, image source 302 is positioned on the same side of optical combiner 301 as the user's eye 125 (i.e., eye-ward side 325). Since reflective diffraction grating 315 is composed of partially reflective elements 335, a portion of image light 220 output from image source 302 is reflected back towards the user's eye 125. In transmission, the diffractive effects of reflective diffraction grating 315 are annihilated by using the same or similar index of refraction material above and below partially reflective elements 335. Since partially reflective elements 335 are also partially transmissive and sandwiched in substantially uniform index material(s), the portion of external scene light 230 that passes through reflective diffraction grating 315 is not diffracted, but rather passes to eye 125 substantially without optical distortion. By simultaneously operating optical combiner 301 in both reflective and transmissive modes, it can be used to overlay image light 220 onto external scene light 330 to provide a type of augmented reality to the user.

Image lens 303 is positioned in the optical path of display light 220 between image source 302 and optical combiner 301 to apply a corrective prescription to display light 220 before the light is incident upon optical combiner 301. In the illustrated embodiment, image lens 303 is held in place over the emission aperture of image source 302 by lens mounts 304. Lens mounts 304 may be a slot into which image lens 303 is inserted or slid, a clip attachment, a hinging clasp or clamp, transparent glue, a friction fit, or otherwise.

External scene lens 306 is positioned in the optical path of external scene light 230 over the external scene side 330 of optical combiner 301 to apply a corrective prescription to external scene light 230 before the light passes through optical combiner 301. In the illustrated embodiment, image lens 303 is held in place over the external scene side 330 of optical combiner 301 by lens mounts 307. Lens mounts 307 may be a slot into which external scene lens 306 is inserted or slid, a clip attachment, a hinging clasp or clamp, transparent glue, a friction fit, or otherwise. In an alternative embodiment, external scene lens 306 is not replaceable; but rather, is permanently formed into the external scene side 330 of substrate 305. In this alternative embodiment, the curvature of the external scene side 330 is different than the eye-ward side 325 of optical combiner 301 (which may be flat) and the macro-shape of the optical combiner forms the external scene lens.

In some embodiments, the shape, size, orientation, and placement of the individual 3D diffraction element shapes formed into base sandwich layer 310 may be designed to provide optical power for magnifying image light 220. This magnifying configuration may be particularly useful in near-to-eye configurations, such as head mounted displays ("HMDs") and some types of heads up displays ("HUDs"), such as scopes. The generic design of diffraction gratings that provide optical power is well known. For example, design of diffractive optics is discussed in "Applied Digital Optics: From Micro-optics to Nanophotonics" by Bernard Kress and Patrick Meyrueis, published by John Wiley and Sons in 2009. In particular, this book discusses how to design and subsequently carve out diffraction structures (microscopic grooves) and select their depth to maximize the amount of light diffracted in a specific diffraction order, while reducing the light diffracted in the zero and higher diffraction orders.

In one embodiment, reflective diffraction grating 315 is an off-axis lens, which is capable of receiving input light at incident angle A1 and reflects the image light along a reflection path having an emission angle A2 that is different from A1. Note, A1 and A2 are measured from the normal of the emission surface of optical combiner 301 out which the reflected image light 220 is emitted. In FIG. 3, the emission surface coincides with eye-ward side 325 of planarization sandwich layer 320. In one embodiment, incident angle A1 is greater or more oblique from normal than emission angle A2. This enables image source 302 to be positioned laterally to optical combiner 301 so as not to block external scene light 230. In HMD configurations, off-axis lensing permits image source 302 to be positioned peripherally in the temple region of the user thereby not obstructing the user's forward vision. The off-axis lensing redirects the emission angle A2 to be less oblique from normal than the incident angle A1, thereby directing the reflected image light into the user's eye at a closer to normal angle, versus overshooting the eye and illuminating the nose. Off-axis lensing using diffractive optics also provides a specific angular bandwidth to reflective diffraction grating 315. This helps reduce distractions due to backside reflections and improve contrast of the reflected image light 220 over external scene light 230.

In FIG. 4, the off-axis lensing is achieved by chirping the diffraction grating pattern and offsetting the center 460 of the pattern relative to the user's center of vision 465. In the illustrated embodiment, the pattern center 460 is denoted as the center of the largest partially reflective element 335. As the pattern extends out from center 460, partially reflective elements 335 become gradually smaller. In FIGS. 3 and 4, the 3D diffraction element shapes have parabolic cross-sectional shapes (see FIG. 3) and rotationally symmetric (circular or spherical lens) or non rotationally symmetric (aspheric lens) perimeter shapes (see FIG. 4). However, other cross-sectional shapes and perimeter shapes (e.g., elliptical, etc.) may be used to create reflective diffraction grating 315. The illustrated embodiment of FIG. 4 is a 16 phase level off-axis diffractive lens; however, other number of phase levels may be used, the most effective lens having an infinite number of phase levels (quasi analog surface relief diffractive lens).

Reflective diffraction grating 315 is formed by overlaying each 3D diffraction element shape with a partially reflective element 335. Partially reflective elements 335 each conformally coat a corresponding 3D diffraction element shape thereby creating a reflective structure that assumes the shape and orientation of the underlying 3D diffraction element shape.

Partially reflective elements 335 may be made of a variety of different materials. In one embodiment, partially reflective elements 335 are fabricated of a layer of conventional non-polarizing beam splitter material (e.g., thin silver layer, CrO2, etc.). The degree of reflectivity may be selected based upon the particular application (e.g., primarily indoor use, outdoor use, combination use, etc.). In one embodiment, partially reflective elements 335 comprise a 10% reflective 100 nm layer of CrO2.

In one embodiment, partially reflective elements 335 are fabricated of a multi-layer dichroic thin film structure. Dichroic films can be created to have a selectable reflectivity at a selectable wavelength. Additionally, the dichroic film can be designed to improve the angle selectivity of the reflective diffraction grating 315. A dichroic film can be designed with high reflectivity to a specific wavelength or wavelength band that overlaps with image light 220 and to the angles of incidence of image light 220, while being substantially more transparent to other visible spectrum wavelengths and to the normal incidence of external scene light 230. In this manner, the efficiency of optical combiner 301 can be improved while also increasing the brightness of the transmitted external scene light 230.

In one embodiment, partially reflective elements 335 are fabricated of polarizing beam splitter material that substantially reflects one linear polarization of incident light while substantially passing the orthogonal linear polarization. In this case, image source 302 could be designed to emit polarized image light matching the reflection characteristic of partially reflective elements 335. Since ambient light typically has a random polarization, approximately 50% of external scene light 230 would pass through optical combiner 301 to eye 125.

Image source 302 may be fabricated using a variety of compact image source technologies such as the various micro-displays used today in pico-projectors, liquid crystal on silicon ("LCOS") displays, backlit liquid crystal displays, organic light emitting diode ("OLED") displays, quantum dot array displays, light emitting diode ("LED") arrays, or otherwise. CRT tubes are still used in HUDs today, but are less likely to be used in smaller devices such as see through Head Mounted Displays (HMDs). Optical combiner 301 may be fabricated of a variety of clear optically transmissive materials, including plastic (e.g., acrylic, thermo-plastics, poly-methyl-metha-crylate (PMMA), ZEONEX—E48R, glass, quartz, etc.). For example, in one embodiment, substrate 305, base sandwich layer 310, and planarization sandwich layer 320 are fabricated of plastic. In another embodiment, substrate 305 is glass while base sandwich layer 310 and planarization sandwich layer 320 are fabricated of silicon dioxide. Of course, other material combinations may be used.

Figure 5:
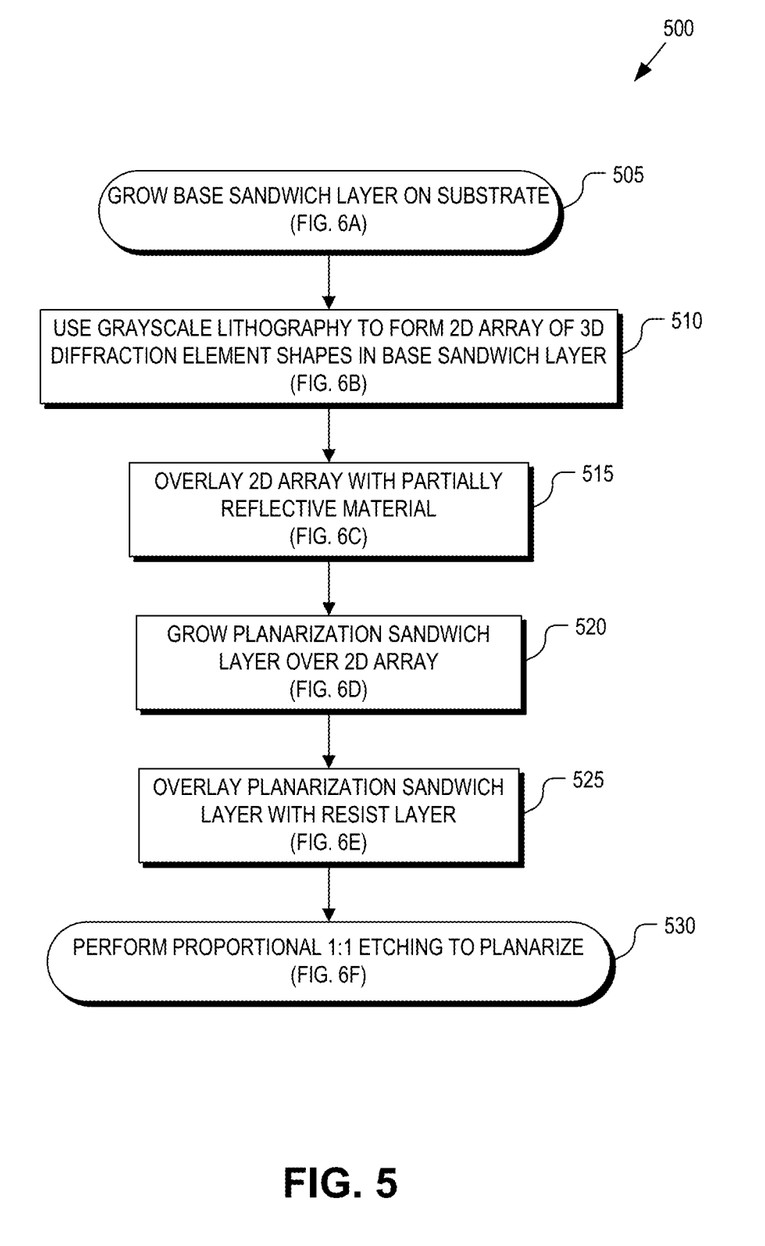
FIG. 5 is a flow chart illustrating a process for fabricating a sandwiched diffractive optical combiner using lithography, in accordance with an embodiment of the disclosure.
Figure 6A:
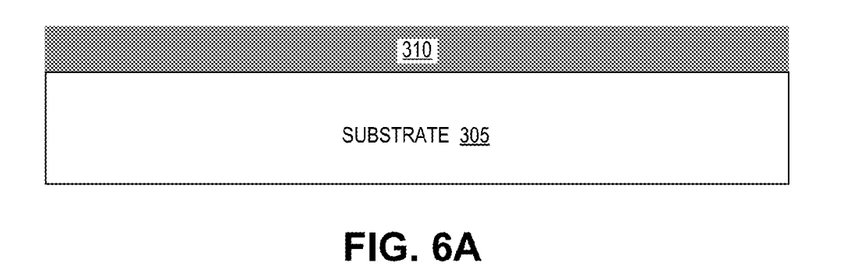
FIGS. 6A-6F illustrate fabrication steps for fabricating a sandwiched diffractive optical combiner using lithography, in accordance with an embodiment of the disclosure.
Figure 6B:
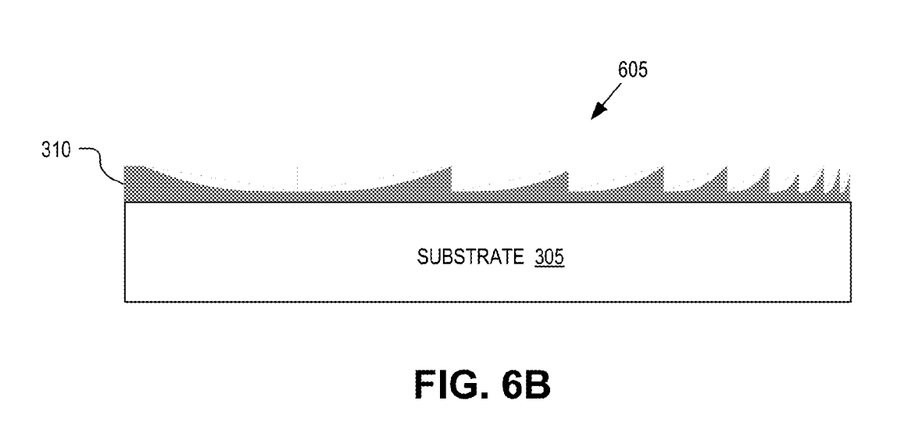
Figure 6C:
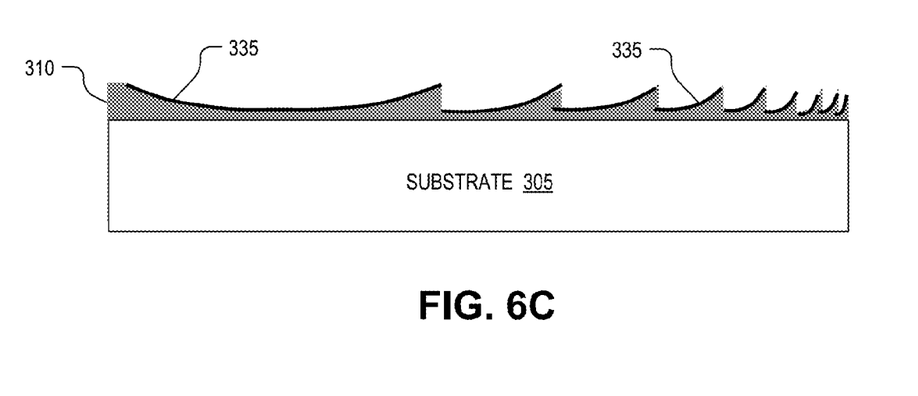
Figure 6D:
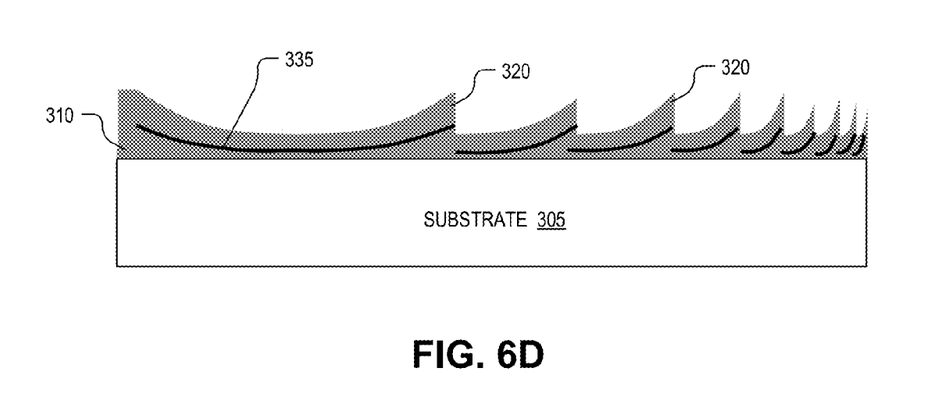
Figure 6E:
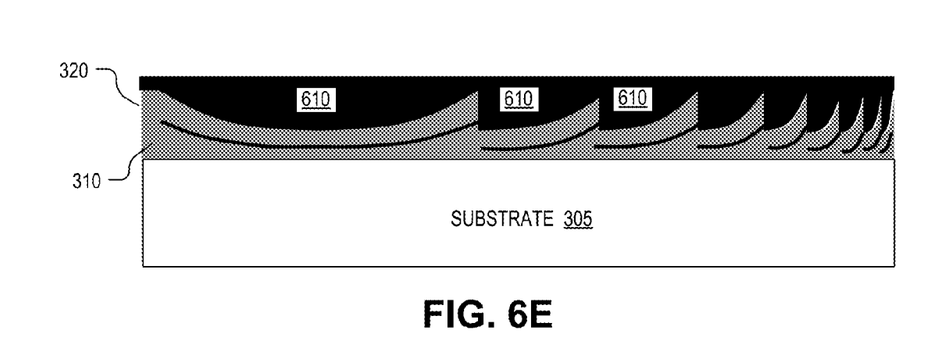
Figure 6F:
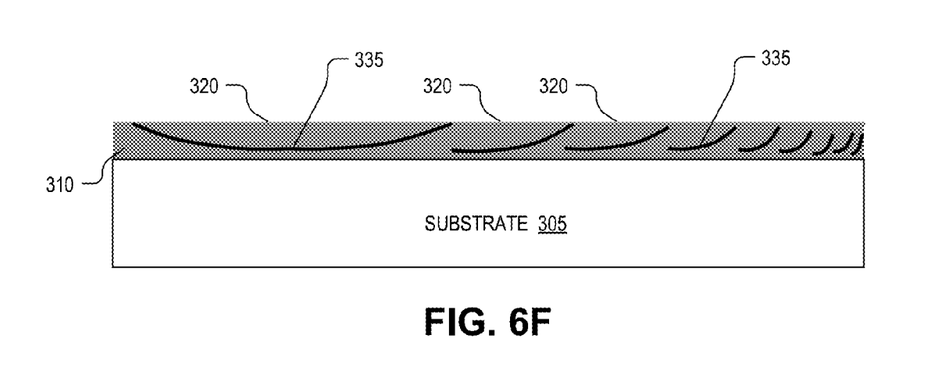

FIG. 5 is a flow chart illustrating an example process 500 for fabricating one embodiment of sandwiched diffractive optical combiner 301 using lithography, in accordance with an embodiment of the disclosure. Process 500 describes one technique for fabricating an embodiment of optical combiner 301 using silicon dioxide on a glass substrate. Process 500 is described with reference to FIGS. 6A-F. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In a process block 505, base sandwich layer 310 is deposited onto substrate 305, which is fabricated of a clear material such as glass, quartz, plastic, or otherwise. In this embodiment, base sandwich layer 310 is a layer of silicon dioxide approximately 1 μm thick. In a process block 510, grayscale lithography and reactive ion etching is used to form the 2D array of 3D diffraction shapes 605 into base sandwich layer 310. In a process block 515, shapes 605 are overlaid via sputtering with a layer of partially reflective material. In one embodiment, the partially reflective material layer is approximately 10% reflective (other reflectivity percentages may be used). In one embodiment, the partially reflective material layer is approximately 100 nm thick of CrO2 material. In a process block 520, planarization sandwich layer 320 is deposited onto of the partially reflective material layer. In one embodiment, planarization sandwich layer 320 is deposited to be approximately 1.5 μm thick. Of course, at this stage planarization sandwich layer 320 is not yet planar. In a process block 525, a resist material 610 is coated over planarization sandwich layer 320. Finally, in a process block 530, resist material 610 is removed during planarization, which proceeds to a depth that results in a planar top to planarization sandwich layer 320. Such a process can be implemented as a proportional reactive ion etching (RIE) process (or CAIBE process—Chemically Assisted Ion Beam Etching) where the resist etching rate and the underlying SiO2 etching rate are exactly similar. In one embodiment, chemical-mechanical polishing is used to remove resist layer 610 and planarize planarization sandwich layer 320. In one embodiment, a proportional reactive ion etch with a 1:1 ratio that etches both resist material 610 and planarization sandwich layer 320 at the same rate is used. Other standard or custom planarization techniques may be used.

Mass production techniques may be used to fabricate various other embodiments of optical combiner 301. For example, a master combiner may be fabricated to be used as a mold for plastic replication via injection molding or hot/UV embossing. Base sandwich layer 310 may be fabricated of thermo-plastic material that is injection molded. Partially reflective elements 335 may be overlaid or coated onto the 2D array of 3D diffraction shapes and planarization sandwich layer 320 laminated over the partially reflective material. Diamond turning with CNC machine-tools may be used in place of lithography to shape the various curved fringes making up the optical combiner. In other embodiments, base sandwich layer 310 may be fabricated using press molding into thermo-plastic or plastic embossing using a roller drum having a negative impression of the 2D array of 3D diffraction shapes disposed thereon.

Figure 7:
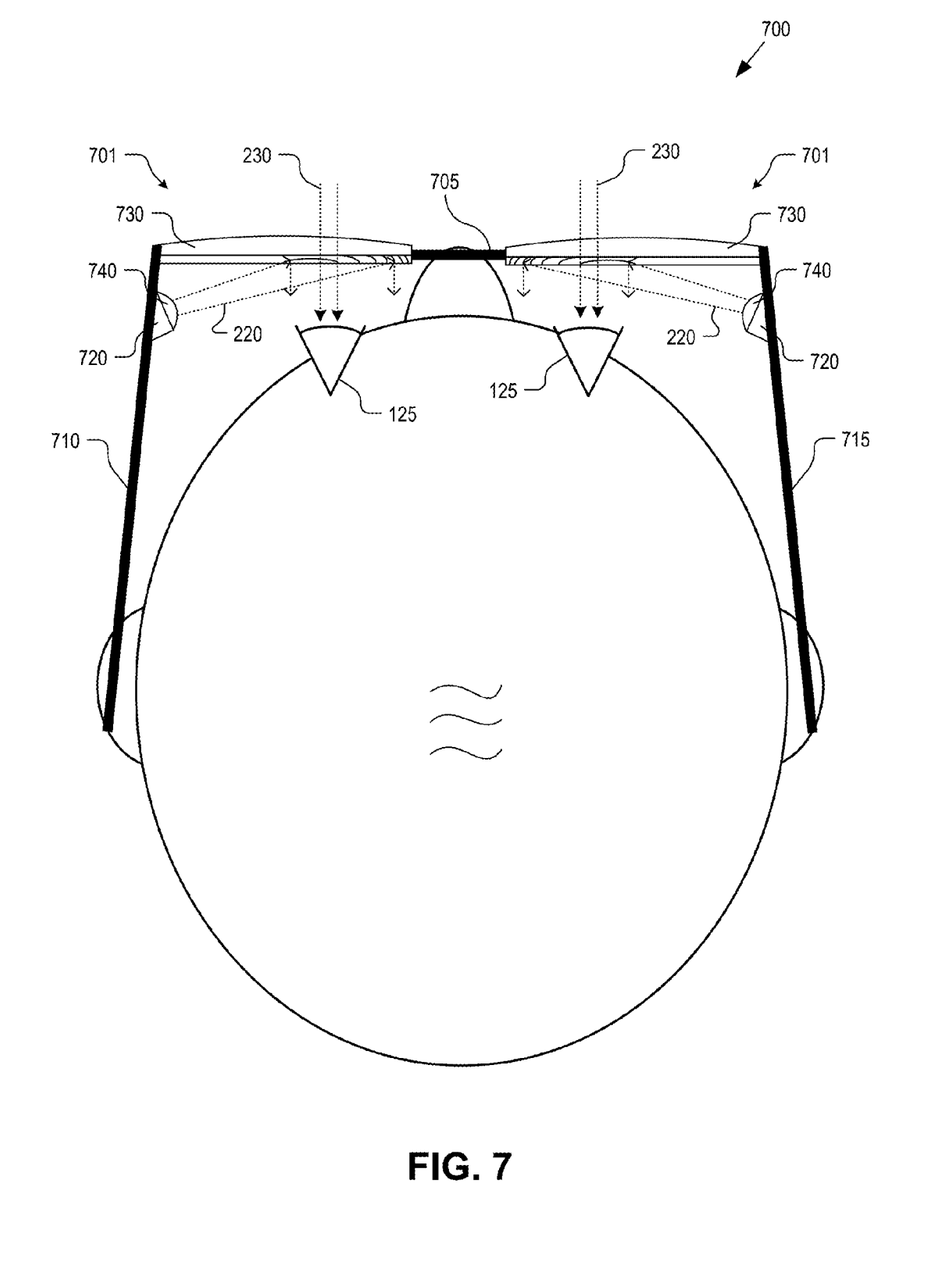
FIG. 7 is a top view of a binocular head mounted display using two see-through displays that each accommodate an eye prescription, in accordance with an embodiment of the disclosure.

FIG. 7 is a top view of a binocular HMD 700 using a pair of see-through displays 701 that accommodate a corrective prescription, in accordance with an embodiment of the disclosure. Each see-through display 701 may be implemented with embodiment of see-through displays 200 or 300. The see-through displays 701 are mounted to a frame assembly, which includes a nose bridge 705, left ear arm 710, and right ear arm 715. Although FIG. 7 illustrates a binocular embodiment, HMD 700 may also be implemented as a monocular HMD.

The see-through displays 701 are secured into an eye glass arrangement that can be worn on the head of a user. The left and right ear arms 710 and 715 rest over the user's ears while nose assembly 705 rests over the user's nose. The frame assembly is shaped and sized to position each optical combiner and external scene lens in front of a corresponding eye 125 of the user. Of course, other frame assemblies having other shapes may be used (e.g., a visor with ear arms and a nose bridge support, a single contiguous headset member, a headband, goggles type eyewear, etc.).

The illustrated embodiment of HMD 700 is capable of displaying an augmented reality to the user. Each see-through display 701 permits the user to see a real world image via external scene light 230. Left and right (binocular embodiment) image light 220 may be generated by image sources 720 mounted to left and right ear arms 710. External scene light 230 is prescriptively corrected by external scene lenses 730 while display light 220 is prescriptively corrected by image lenses 740. Corrected image light 220 is seen by the user as a virtual image superimposed over corrected external scene light 230 as an augmented reality. In some embodiments, external scene light 230 may be partially blocked or selectively blocked to provide sun shading characteristics and increase the contrast of image light 220.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical apparatus for a head mounted display, comprising:
    an image source coupled to emit image light;
    an optical combiner having an eye-ward side and an external scene side and including a partially reflective diffraction grating that is at least partially reflective to the image light incident through the eye-ward side of the optical combiner and at least partially transmissive to external scene light incident through the external scene side of the optical combiner;
    an image lens disposed in an optical path of the image light between the image source and the eye-ward side of the optical combiner to apply a first corrective prescription to the image light emitted from the image source; and
    an external scene lens disposed over the external scene side of the optical combiner to apply a second corrective prescription to the external scene light that passes through the optical combiner,
    wherein the optical combiner combines the image light with the scene light to form a combined image that is corrected according to the first and second corrective prescriptions and propagates along a common viewing path extending along an eye-ward direction from the eye-ward side.

2. The optical apparatus of claim 1, further comprising:
    a frame assembly to support the image source, the optical combiner, the image lens, and the external scene lens for wearing on a head of a user with the optical combiner and external scene lens positioned in front of an eye of the user and the image source and the image lens positioned peripherally to the eye of the user.

3. The optical apparatus of claim 2, further comprising a mount to hold the image lens in front of the image source, wherein the image lens is replaceable and the mount accommodates different image lenses with different corrective prescriptions.

4. The optical apparatus of claim 2, further comprising a mount to hold the external scene lens in front of the optical combiner, wherein the external scene lens is replaceable and the mount accommodates different external scene lenses with different corrective prescriptions.

5. The optical apparatus of claim 2, wherein at least one of the image lens or the external scene lens is an adjustable lens that applies an adjustable corrective prescription.

6. The optical apparatus of claim 5, wherein the adjustable lens comprises a fluid lens or a pair of overlapping lens elements that slide laterally relative to each other.

7. The optical apparatus of claim 1, wherein the optical combiner further comprises:
    a base sandwich layer having a first index of refraction and including a first side facing the eye-ward side;
    a two-dimensional ("2D") array of three-dimensional ("3D") diffraction element shapes disposed in the first side of the base sandwich layer;
    partially reflective elements each coating one of the 3D diffraction element shapes and conforming thereto, wherein the partially reflective elements collectively form the partially reflective diffraction grating having magnifying optical power for the image light incident through the eye-ward side of the optical combiner; and
    a planarization sandwich layer disposed over the partially reflective elements having a second index of refraction substantially equal to the first index of refraction of the base sandwich layer such that external scene light incident through the external scene side passes through the optical combiner substantially without diffraction while the image light incident through the eye-ward side is reflected and magnified via the partially reflective diffraction grating.

8. The optical apparatus of claim 7, wherein the partially reflective diffraction grating comprises an off-axis diffractive lens that receives the image light incident upon the eye-ward side at a first angle and reflects the image light along a reflection path having a second angle, wherein the first angle is more oblique relative to a normal of an emission surface of the planarization sandwich layer than the second angle.

9. The optical apparatus of claim 7, wherein the base sandwich layer includes a second side opposite the first side and facing the external scene side, the optical combiner further comprising:
    an optically transmissive substrate physically mated to the second side of the base sandwich layer to provide mechanical support to the base sandwich layer and the partially reflective diffraction grating.

10. The optical apparatus of claim 9, wherein the external scene lens is mated to the optically transmissive substrate and wherein the optically transmissive substrate and the external scene lens having matching indexes of refraction.

11. The optical apparatus of claim 1, wherein the external scene side of the optical combiner has a first curvature that is different than a second curvature of the eye-ward side such that a macro-shape of the optical combiner comprises the external scene lens.

12. An optical apparatus, comprising:
    an optical combiner having an eye-ward side and an external scene side and including a partially reflective diffraction grating that is at least partially reflective to image light incident through the eye-ward side of the optical combiner and at least partially transmissive to external scene light incident through the external scene side of the optical combiner;
    a first mount positioned to hold an image lens in an optical path of the image light to apply a first corrective prescription to the image light prior to reaching the eye-ward side of the optical combiner; and a second mount positioned to hold an external scene lens over the external scene side of the optical combiner to apply a second corrective prescription to the external scene light that passes through the optical combiner, wherein the optical combiner combines the image light with the scene light to form a combined image that is corrected according to the first and second corrective prescriptions and propagates along a common viewing path extending along an eye-ward direction from the eye-ward side.

13. The optical apparatus of claim 12, wherein the image lens is replaceable and the first mount accommodates different image lenses with different corrective prescriptions.

14. The optical apparatus of claim 12, wherein the external scene lens is replaceable and the second mount accommodates different external scene lenses with different corrective prescriptions.

15. The optical apparatus of claim 12, wherein at least one of the image lens or the external scene lens is an adjustable lens that applies an adjustable corrective prescription.

16. The optical apparatus of claim 15, wherein the adjustable lens comprises a fluid lens or a pair of overlapping lens elements that slide laterally relative to each other.

17. The optical apparatus of claim 12, wherein the optical combiner further comprises:

a base sandwich layer having a first index of refraction and including a first side facing the eye-ward side;

a two-dimensional ("2D") array of three-dimensional ("3D") diffraction element shapes disposed in the first side of the base sandwich layer;

partially reflective elements each coating one of the 3D diffraction element shapes and conforming thereto, wherein the partially reflective elements collectively form the partially reflective diffraction grating having magnifying optical power for the image light incident through the eye-ward side of the optical combiner; and a planarization sandwich layer disposed over the partially reflective elements having a second index of refraction substantially equal to the first index of refraction of the base sandwich layer such that external scene light incident through the external scene side passes through the optical combiner substantially without diffraction while the image light incident through the eye-ward side is reflected and magnified via the partially reflective diffraction grating.

18. The optical apparatus of claim 17, wherein the partially reflective diffraction grating comprises an off-axis diffractive lens that receives the image light incident upon the eye-ward side at a first angle and reflects the image light along a reflection path having a second angle, wherein the first angle is more oblique relative to a normal of an emission surface of the planarization sandwich layer than the second angle.

19. The optical apparatus of claim 18, wherein the external scene side of the optical combiner has a first curvature that is different than a second curvature of the eye-ward side such that a macro-shape of the optical combiner comprises the external scene lens.

* * * * *